UNITED STATES PATENT OFFICE.

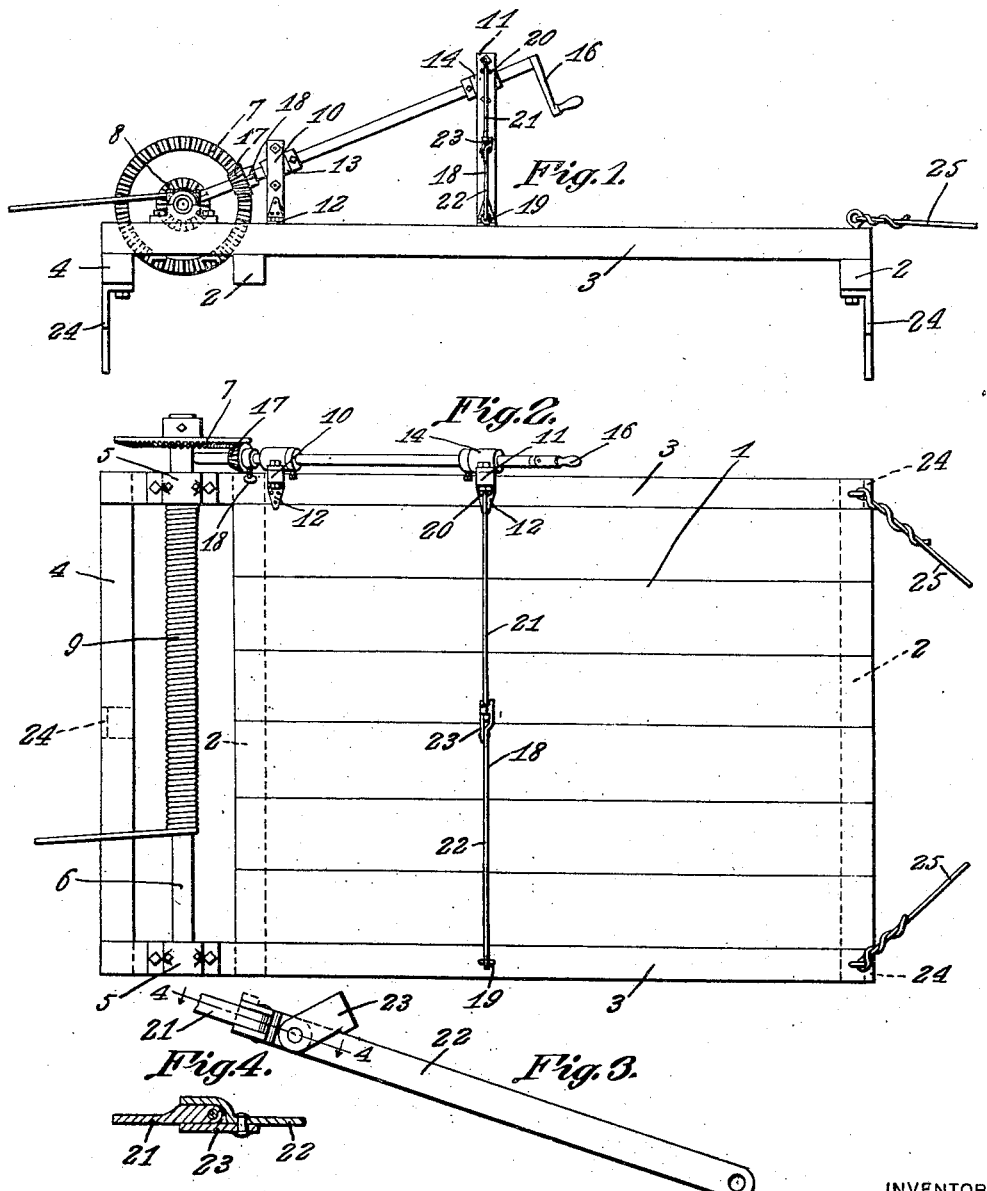

FRANK T. OWSLEY, OF SPAVINAW, OKLAHOMA.

AUTOMOBILE-PULLER.

1,250,344.  Specification of Letters Patent.  Patented Dec. 18, 1917.

Application filed December 20, 1916. Serial No. 138,025.

*To all whom it may concern:*

Be it known that I, FRANK T. OWSLEY, a citizen of the United States, residing at Spavinaw, in the county of Mayes and State of Oklahoma, have invented certain new and useful Improvements in Automobile-Pullers, of which the following is a specification.

This invention relates to an automobile puller and the primary object is to provide a device for pulling an automobile from an embedded position when the machine sinks in the sand or soft mud and is unable to proceed through the medium of its own power.

Another object of the invention is to provide a platform having means whereby an effective grip may be obtained in a firm portion of the surrounding land and provided with means for attaching the automobile to the platform whereby the latter may be withdrawn from its embedded position.

Another object of the invention is to provide manually operated means for pulling the automobile, the means including a construction whereby the operator may vary the pull exerted by the pulling cable when the automobile is being withdrawn.

A further object of this invention is the provision of an automobile puller which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation.

Fig. 2 is a top plan.

Fig. 3 is a fragmentary elevation of a detail of the invention.

Fig. 4 is a section on the line 4—4 of Fig. 3.

Fig. 5 is a detail elevation of one of the gripping elements.

Referring to the drawing, wherein is illustrated the preferred form of my invention, and in which like numerals of reference indicate corresponding parts throughout the several views, the platform 1 is constructed of any suitable material and is mounted upon a pair of cross beams 2. Each longitudinal edge of the platform includes an elongated beam 3 the forward ends of which are projected beyond the forward edge of the platform 1. The terminals of the beams 3 are connected by a cross beam 4.

Rotatably mounted in bearings 5 is a cable winding drum 6 and one end of the drum is projected beyond one of the bearings 5 and receives a gear which is provided with two sets of gear teeth 7 and 8. The teeth 7 are arranged around the edge of the gear in the usual manner while the teeth 8 are arranged adjacent the center of the gear thereby providing two bevel gears of different diameter. A cable 9 is wound upon the drum 6 and the end of the cable may be attached to an automobile when the device is in use.

Mounted on one of the beams 3, at the edge at which the gear is mounted, is a pair of standards 10 and 11, the standard 11 being considerably higher and longer than the standard 10. The lower ends of these standards are hingedly connected to the platform by the hinges 12 for a purpose presently described. Angularly disposed bearings 13 and 14 are carried by the said standards 10 and 11 while rotatably mounted in the bearings is an operating shaft 15 having a crank 16 mounted at one end. The opposite end of the shaft carries a bevel pinion 17 provided with a set screw 18 for permitting the pinion to be longitudinally moved on the shaft and fixed thereto at any desired point. The bevel pinion 17 is constructed so that its teeth will mesh with the teeth of either the gear 7 or the gear 8 and the shaft 15 is extended so that the pinion may be moved to the end of the shaft for engaging the teeth of the small gear 8.

A brace element 18 has one end mounted at one edge of the platform through the medium of an eye 19 the opposite end of the brace being connected to the upper end of the standard 11 by an eye 20. The brace element 18 is divided into two sections 21 and 22 and these sections are hingedly connected together as shown in detail in Fig. 3. The proximate end of the section 22 is provided with ears through which a pivot pin is projected which also extends through an opening in the proximate end of the section 21. Now, when the device is not in use, the parts may be folded into a minimum space and, it will be seen that when the standards 10 and 11 are swung downwardly on the hinges 12, the sections 21 and 22 will pivot on the joint above described and the operating shaft and the parts associated therewith will be disposed in close proximity to the surface of the platform. In this manner the device may be easily disposed in a minimum space. For preventing buckling of the brace element when the device is in use I have provided a latch 23 pivotally mounted adjacent the pivoted ends of the sections 21 and 22. In operative position the latch is drawn into the position shown by dotted lines in Fig. 3 and by full lines in Fig. 2. When folded the brace and latch is swung to the position shown by full lines in Figs. 3 and 4 thereby permitting the two sections to be easily folded.

Each cross beam carries one or more cleats 24 one of which is shown in detail in Fig. 5. These cleats may be of any desired width or length and when the device is in use the cleats are drawn into the ground and the platform will be prevented from moving when the automobile is being pulled from its embedded position. If desired the rear edge of the platform may be connected to a cable 25 which will be fastened to a suitable anchor.

From the foregoing it will be observed that a very simple and durable automobile puller has been provided, the details of which embody the preferred form. I desire it to be understood however, that slight changes in the minor details of construction may be made without departing from the spirit of the invention or the scope of the claims hereunto appended.

I claim:

1. An automobile puller comprising a platform, a drum supported by the platform and having a cable wound thereon, a bevel gear mounted upon the drum, the said bevel gear including an outer and an inner toothed portion forming two gears of different sizes, a rotatable shaft disposed at an obtuse angle with respect to the said platform, a pinion mounted upon the shaft and engageable with either the large or the small bevel gear, means for supporting the said angularly disposed shaft, the said means including standards hingedly mounted on the platform, and means for holding the standards in operative position.

2. An automobile puller comprising a platform having a drum mounted thereon, gearing mechanism for rotating the said drum and including a shaft rotatably mounted, a pair of standards hingedly connected to the platform and supporting the said shaft, a brace element for the said standards including a pair of sections hingedly connected together, a pivot pin connecting the proximate ends of the said sections, and a latch associated with the said sections for preventing buckling of the brace element when the device is in use.

3. An automobile puller comprising a platform, a drum supported by the platform and provided with a double bevel gear on one end, a rotatable shaft, a pinion carried by the shaft and adapted to engage either toothed portion of the said double gear, collapsible means supporting the said rotatable shaft, and a brace element associated with said collapsible means and including a pair of sections pivotally connected together, and a latch for bracing the pivot of the said brace element.

4. An automobile puller comprising a platform, a drum supported by the platform, gearing mechanism mounted upon the drum and including a large and a small bevel gear, a pinion adapted to engage either the said large or small bevel gear, means for rotating the said pinion, and supporting means for the said pinion and for the said mentioned first means, the said supporting means being pivotally mounted on the platform whereby the said pinion may be moved out of or into engagement with either of the said gears.

5. An automobile puller comprising a platform, a drum supported by the platform, gearing mechanism mounted upon the drum and including a large and a small bevel gear, a pinion adapted to engage either the said large or small bevel gear, a rotatable shaft carrying the said pinion and disposed to permit the pinion to engage either of the said gears, a pair of standards hingedly mounted upon the platform, bearings carried by the standards and rotatably receiving the said shaft, and means for bracing one of the said standards.

6. An automobile puller comprising a platform, a drum supported by the platform, gearing mechanism mounted upon the drum and including a large and a small gear, a pinion adapted to engage either the said large or small bevel gear, a rotatable shaft carrying the said pinion and disposed to permit the pinion to engage either of the said gears, a pair of standards hingedly mounted upon the platform, bearings carried by the standards and rotatably receiving the said shaft, a brace element for the said standard comprising a pair of sections having their proximate ends hingedly connected, and means engaging the hinge connection for preventing buckling of the said sections when the brace element is in operative position.

In testimony whereof I affix my signature in presence of two witnesses.

FRANK T. OWSLEY.

Witnesses:
HINES KOLB,
W. H. MCCASLIN.

Copies of this patent may be obtained for five cents each, by addressing the "Commissioner of Patents, Washington, D. C."